US009057808B2

(12) United States Patent
Scardato

(10) Patent No.: US 9,057,808 B2
(45) Date of Patent: Jun. 16, 2015

(54) TEXTURED LIGHT GUIDE TO REDUCE FRICTION WITH FILM

(71) Applicant: APPLE INC., Cupertino, CA (US)

(72) Inventor: Steven M. Scardato, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 118 days.

(21) Appl. No.: 13/886,970

(22) Filed: May 3, 2013

(65) Prior Publication Data

US 2014/0071382 A1 Mar. 13, 2014

Related U.S. Application Data

(60) Provisional application No. 61/699,759, filed on Sep. 11, 2012.

(51) Int. Cl.

| | |
|---|---|
| ***G02F 1/133*** | (2006.01) |
| ***F21V 8/00*** | (2006.01) |
| ***G02F 1/1335*** | (2006.01) |

(52) U.S. Cl.

CPC ........ *G02B 6/0035* (2013.01); *G02F 1/133615* (2013.01); *G02B 6/0068* (2013.01); *G02F 1/133606* (2013.01); *G02F 1/133608* (2013.01); *G02F 2203/60* (2013.01); *G02B 6/0036* (2013.01)

(58) Field of Classification Search

CPC ........................ G02F 1/133615; G02B 6/0068

USPC ........................................................... 349/65

See application file for complete search history.

(56) References Cited

U.S. PATENT DOCUMENTS

| | | | | |
|---|---|---|---|---|
| 7,719,642 | B2 | 5/2010 | Son et al. | |
| 2008/0043173 | A1 | 2/2008 | Lin et al. | |
| 2009/0135627 | A1 | 5/2009 | Furuyama et al. | |
| 2009/0279324 | A1 * | 11/2009 | Chen et al. | 362/616 |
| 2010/0165241 | A1 | 7/2010 | Kim et al. | |
| 2013/0335678 | A1 * | 12/2013 | Syu et al. | 349/65 |

FOREIGN PATENT DOCUMENTS

| | | |
|---|---|---|
| WO | 2011119382 A2 | 9/2011 |

* cited by examiner

*Primary Examiner* — Phu Vu

(74) *Attorney, Agent, or Firm* — Fletcher Yoder PC

(57) ABSTRACT

Systems, devices, and methods are provided for using a textured surface of a light guide plate to reduce friction between the light guide plate and an adjacent film. A textured surface across an interior region of the light guide may guide light towards a top surface of the textured light guide. A film positioned on the bottom surface of the textured light guide may reflect light towards the top surface. The film may be positioned within the interior region as a substantially flat (e.g., planar) layer. The surface features may reduce the friction to enable the textured light guide plate and/or film to expand or contract independently from one another due to varying temperatures without forming wrinkles on the film or changing the planarity of the film.

25 Claims, 6 Drawing Sheets

18
64
68
5
62
80
82
84
5
60
66

TEXTURED LIGHT GUIDE TO REDUCE FRICTION WITH FILM

CROSS REFERENCE TO RELATED APPLICATIONS

This application is a Non-Provisional Application of U.S. Provisional Patent Application No. 61/699,759, entitled "Textured Light Guide to Reduce Friction with Film", filed Sep. 11, 2012, which is herein incorporated by reference.

BACKGROUND

The present disclosure relates generally to a backlight assembly for an electronic display and, more particularly, to a backlight assembly having a patterned light guide.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays, such as liquid crystal displays (LCDs), commonly appear in many different electronic devices, such as televisions, computers, and phones. LCDs portray images by modulating the amount of light that passes through a liquid crystal layer within pixels of varying color. A display driver for the LCD produces images on the display by adjusting the image signal supplied to each pixel across the display. The brightness of an LCD depends on the amount of light provided by a backlight assembly. As the backlight assembly provides more light, the brightness of the LCD increases.

Backlight assemblies may be arranged in a direct-lit backlight configuration in which a light source (e.g., a lamp or light emitting diodes) is provided behind, and directs light through a light guide plate, or light guide, to an LCD panel. To reduce the thickness of the LCD, an edge-lit backlight configuration may instead be used, in which the light source is oriented to illuminate an edge of the light guide, which in turn distributes such light to the LCD panel. Various films may be used with the light guide to affect the light directed to the LCD panel. Unfortunately, non-uniformities in a film may affect the appearance of the display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, devices, and methods for using a textured surface of a light guide plate to reduce friction between the light guide plate and an adjacent film. By reducing the friction between the light guide plate and the film, non-uniformities of the film may be avoided when temperature changes cause the light guide plate and the film to expand and/or contract at different rates. In one example, a light source (e.g., light emitting diodes (LEDs), cold cathode fluorescent lamps (CCFLs)) may emit light along a first edge of the light guide. The first edge is between a top face and an opposing bottom face of the light guide. The bottom face may include a textured surface across an interior region of the light guide. The textured surface may include a pattern of dots, bumps, notches, grooves, or other surface features spaced a distance from the perimeter of the light guide. In some embodiments, at least part of the textured surface may direct the light towards the top face of the textured light guide. A film (e.g., reflector) positioned on the bottom face of the textured light guide may reflect light from the light source towards the top face. The film may be positioned on the textured light guide within the interior region as a substantially flat (e.g., planar) layer to enable the display to have a uniform appearance, such as by uniformly reflecting light toward the top face. The surface features may reduce the friction to enable the textured light guide plate and/or film to expand or contract independently from one another without forming wrinkles on the film or changing the planarity of the film.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an example," or the like, are not intended to be interpreted as excluding the existence of additional embodiments that also incorporate the recited features.

As mentioned above, embodiments of the present disclosure relate to a textured light guide plate that reduces friction between the textured light guide plate and a film. Surface features may be spread across an interior region of a surface of the textured light guide. The film may be a reflector film positioned along a plane beneath the textured light guide. The film may be positioned within the interior region and spaced a distance from an interior region perimeter so that the film remains within the interior region regardless of temperature. The surface features may reduce the friction between the textured light guide and film so that differences in magnitudes and/or rates of thermal expansion and contraction of the textured light guide and film do not cause the film to wrinkle or form non-uniformities along its plane. The surface features may enable the film to slide relative to the textured light guide.

Figure 1:
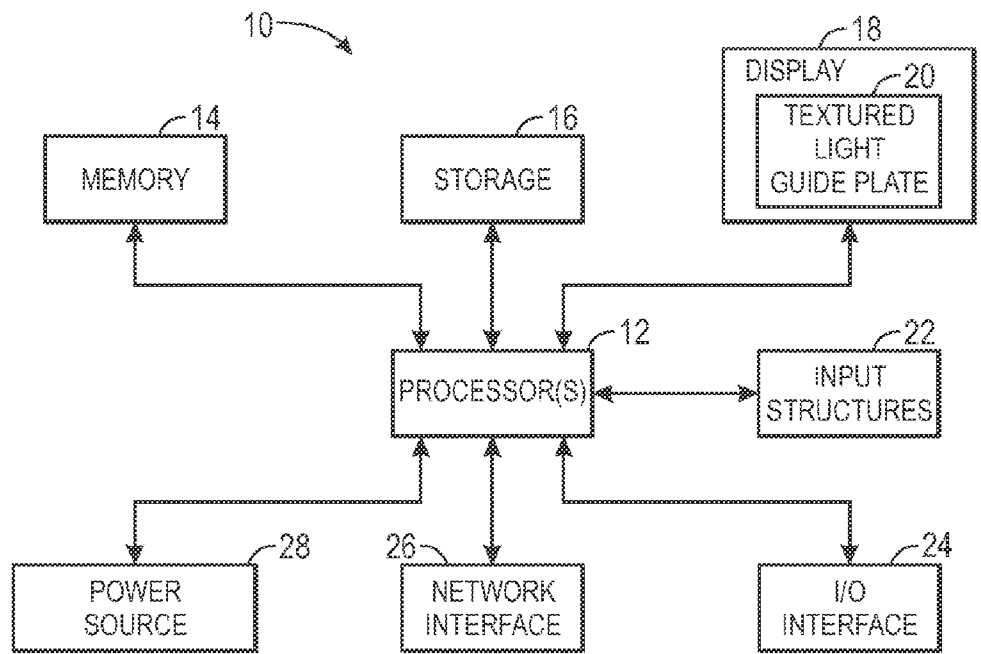
FIG. 1 is a schematic block diagram of an electronic device that incorporates a display with a textured light guide plate, in accordance with an embodiment.
Figure 2:
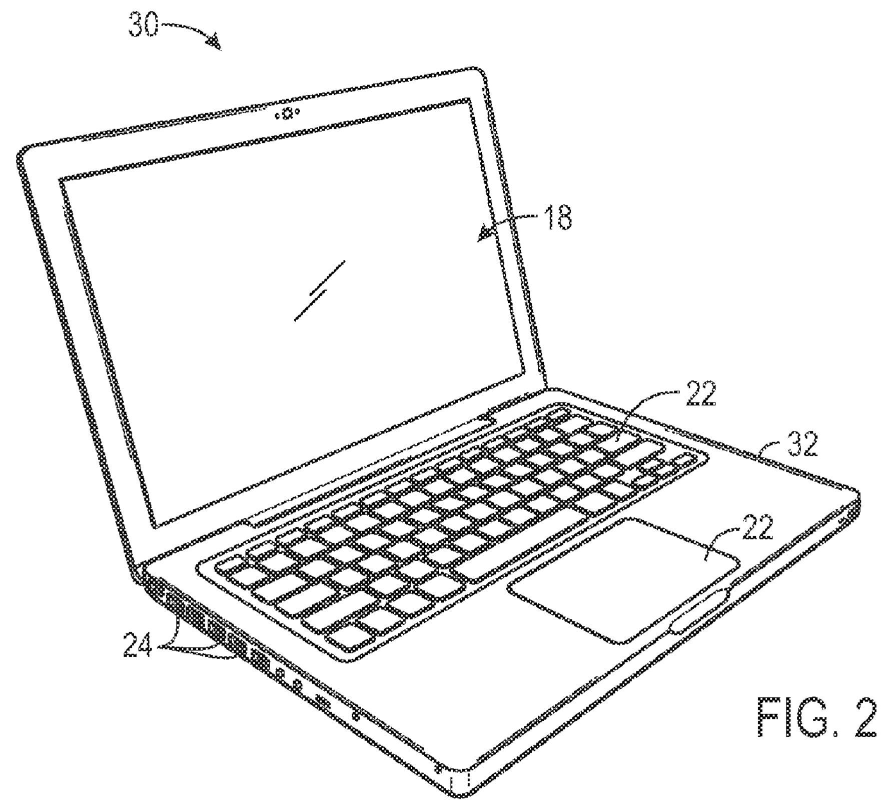
FIG. 2 is a perspective view of an example of the electronic device of FIG. 1 in the form of a notebook computer, in accordance with an embodiment.
Figure 3:
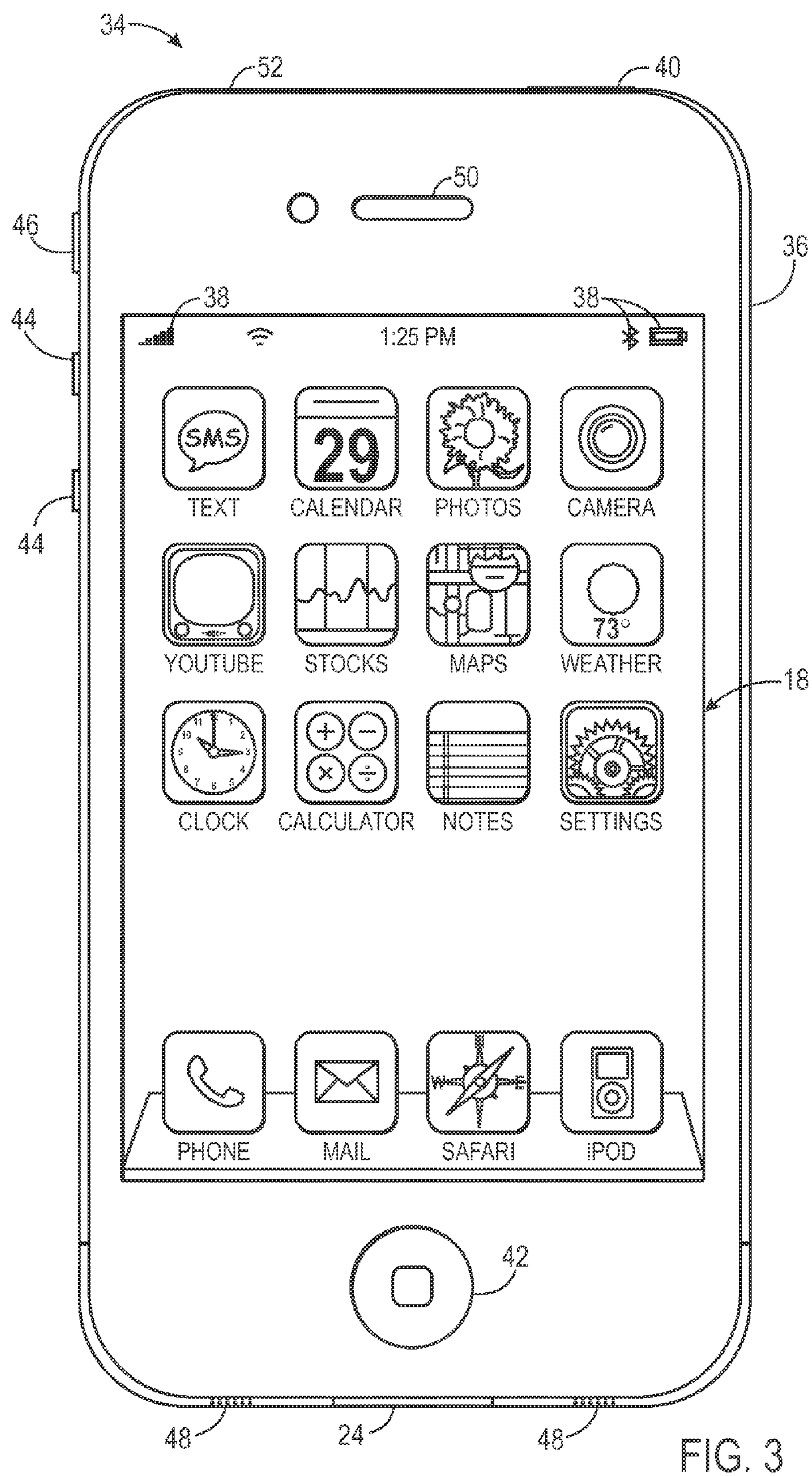
FIG. 3 is a front view of an example of the electronic device of FIG. 1 in the form of a handheld electronic device, in accordance with an embodiment.

With the foregoing in mind, a general description of suitable electronic devices that may employ electronic displays with a textured light guide will be provided below. In particular, FIG. 1 is a block diagram depicting various components that may be present in an electronic device suitable for use with such a display. FIGS. 2 and 3 illustrate various examples of suitable electronic devices in the form of a notebook computer and a handheld electronic device, respectively.

Turning first to FIG. 1, an electronic device 10 according to an embodiment of the present disclosure may include, among other things, one or more processor(s) 12, memory 14, nonvolatile storage 16, a display 18 having a textured light guide plate 20, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to execute instructions to carry out various functions of the electronic device 10. Among other things, these functions may include generating image data to be displayed on the display 18. The programs or instructions executed by the processor(s) 12 may be stored in any suitable article of manufacture that includes one or more tangible, computer-readable media at least collectively storing the instructions or routines, such as the memory 14 and/or the nonvolatile storage 16. The memory 14 and the nonvolatile storage 16 may represent, for example, random-access memory, read-only memory, rewritable flash memory, hard drives, and optical discs. Also, programs (e.g., an operating system) encoded on such a computer program product may also include instructions that may be executed by the processor(s) 12 to enable other functions of the electronic device 10.

The display 18 may be a touch-screen liquid crystal display (LCD), for example, which may enable users to interact with a user interface of the electronic device 10. By way of example, the display 18 may be a MultiTouch™ display that can detect multiple touches at once. The display 18 may include a textured light guide plate 20 to guide (e.g., reflect and/or refract) light from light sources to illuminate substantially the entire display 18. Illuminating the display 18 may increase the visibility of the image data shown on the display 18. As discussed in detail below, textured light guide 20 may include light-extracting elements, such as printed dots, micro-lenses, and/or micro-prisms, or any other type of optical feature suitable for disrupting total internal reflection within the textured light guide 20. The light-extracting elements or other surface features may reduce the friction between the light guide and an adjacent film. Reducing the friction between the textured light guide 20 and an adjacent film may enable the textured light guide 20 to expand and contract relative to the film without sticking to the film and forming wrinkles, folds, ridges, or other planar irregularities. Sticking may be defined herein as exerting a friction force sufficient to compress or fold the film. The textured light guide 20 may enable the electronic device 10 to be exposed to large temperature shifts (e.g., approximately 50° C. or more) without forming non-uniformities of the film adjacent to the textured light guide 20 that may affect the appearance of the display 18.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. The input structures 22, such as a keyboard and/or touchpad, may be used to interact with the computer 30. Via the input structures 22, a user may start, control, or operate a GUI or applications running on computer 30.

The display 18 of the computer 30 may be a backlit liquid crystal display (LCD). A textured light guide 20 may guide light from light sources to illuminate an LCD panel to display images on the display 18. Substantially planar films (e.g., reflective films) may be positioned adjacent to the textured light guide 20 to affect the appearance (e.g., brightness, viewing angle, polarization) of the display 18. As discussed in detail below, surface features of the textured light guide 20 may enable the textured light guide 20 to expand and contract differently than any film positioned adjacent to the textured light guide 20 without affecting the planarity of the film.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may turn the display 18 on or off, the input structure 42 may navigate a user interface to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones.

Like the display 18 of the computer 30, the display 18 of the handheld device 34 may be a backlit liquid crystal display (LCD). The textured light guide 20 may enable the display 18 to maintain a substantially uniform display appearance after exposure to varying temperatures. For example, surface features of the textured light guide 20 may reduce friction between the textured light guide 20 and any adjacent films (e.g., specular reflector film). The textured light guide 20 may reduce wrinkling, gathering, or unevenness of the films as the textured light guide 20 expands and contracts in varying amounts relative to adjacent films.

Figure 4:
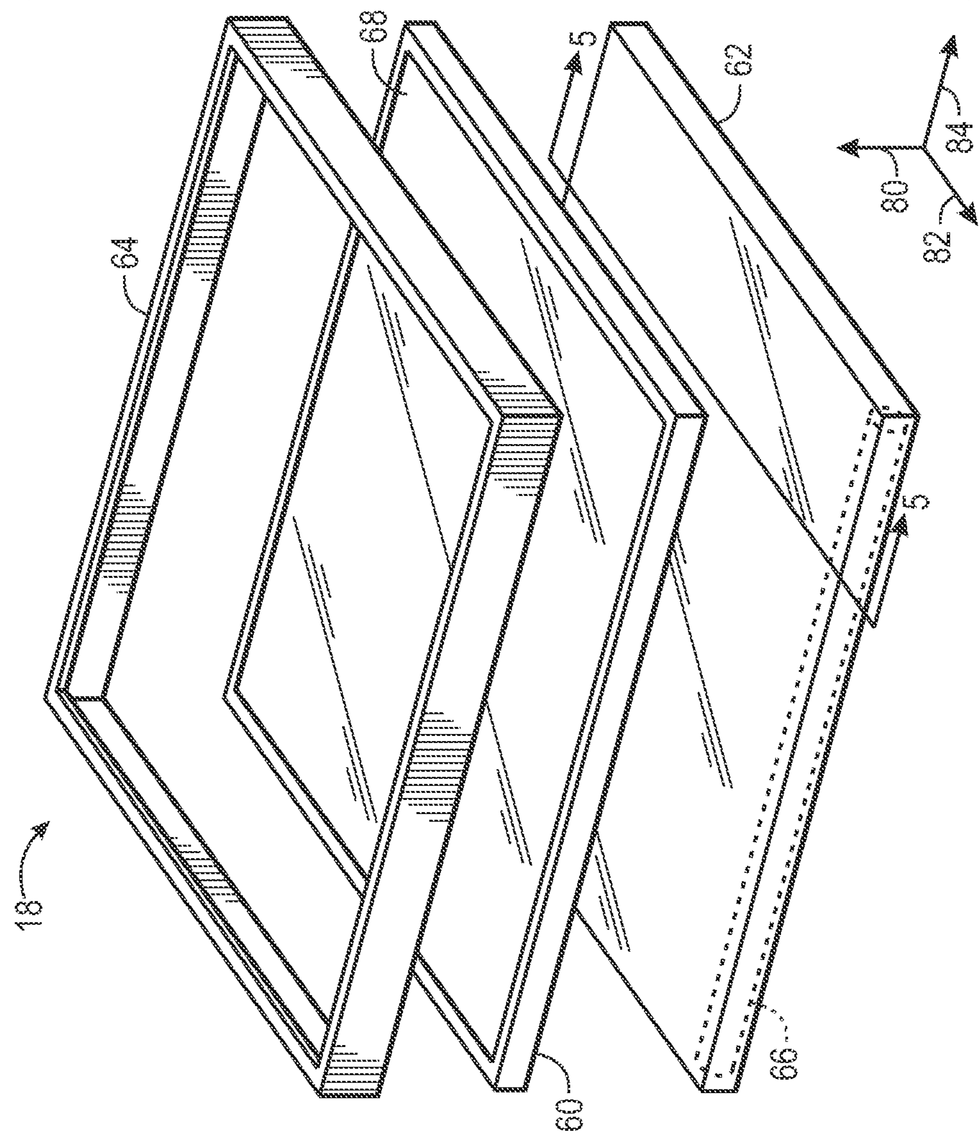
FIG. 4 is an exploded-view of the electronic display of the electronic device with a backlight assembly, in accordance with an embodiment.

One example of the display 18 appears in exploded-view in FIG. 4. The display 18 generally includes an LCD panel 60 and a backlight assembly 62, which may be assembled within frame 64. The backlight assembly 62 supplies the light that illuminates the LCD panel 60. This light derives from a light source 66, which is routed through portions of the backlight assembly 62 before being emitted toward the LCD panel 60. The light source 66 may include a cold-cathode fluorescent lamp (CCFL), one or more light emitting diodes (LEDs), or any other suitable source of light. As may be appreciated, the LCD panel 60 may include numerous pixels that selectively modulate the amount and color of light passing from the backlight assembly 62 through a display region 68 of the LCD panel 60 viewable by a user. The LCD panel 60 may employ any suitable liquid crystal display architecture, such as twisted nematic (TN), in-plane switching (IPS), fringe-field switching (FFS), and/or vertical alignment (e.g., multi-domain vertical alignment (MVA) or patterned vertical alignment (PVA)).

The backlight assembly 62 may include a variety of individual layers and components. Some of these layers and components appear in a schematic view of the backlight assembly 62 that appears in FIG. 5. The backlight assembly 62 illustrates the interface between a textured light guide 20 that receives light from the light source 66 (e.g., via light-emitting diodes (LEDs) 70) and a film 72 (e.g., specular reflector film). As such, it should be appreciated that the backlight assembly 62 may include other layers and components disposed above and below those shown in FIG. 5. Moreover, the textured light guide 20 and the film 72 are shown in separated from one another for clarity. When the backlight assembly 62 is manufactured, however, the textured light guide 20 and the film 72 are adjacent one another.

Figure 5:
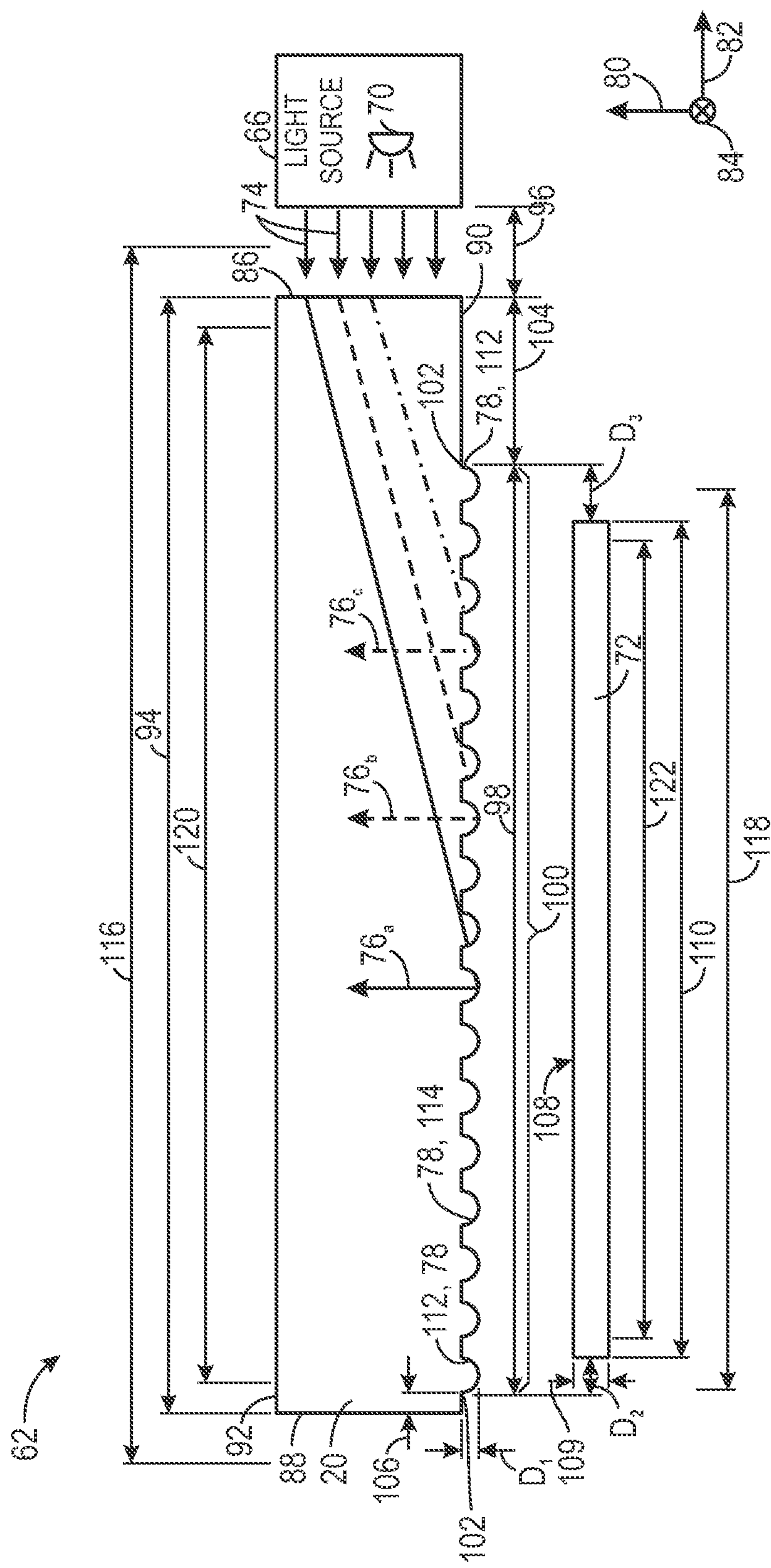
FIG. 5 is a schematic view of an embodiment of the backlight assembly of FIG. 4, taken along line 5-5, illustrating a light guide and a reflector film.

To provide light to the LCD panel 60, the light source 66 supplies light 74 to the textured light guide 20. The light 74 may pass through the textured light guide 20 via total internal reflection until exiting the textured light guide 20. Light rays **76*a*, 76*b*, and 76*c* illustrate light 74 passing into the textured light guide 20. Surface features 78 may be molded, etched, or otherwise positioned on the textured light guide 20. The surface features 78 disrupt the total internal reflection of the light rays through the textured light guide 20 and direct the light toward the LCD panel 60. For ease of explanation, the backlight assembly 62 may be described in relation to a coordinate system along a vertical Y-axis 80, a horizontal X-axis 82, and a horizontal Z-axis 84. Points higher along the Y-axis 80 may be referred to as "above," "higher," "on top of," and so forth. Points lower along the Y-axis 80 may be referred to as "beneath," "lower," "below," and so forth. The light source 66 emits light 74 into a first edge 86 of the textured light guide 20 primarily along the X-axis 82 toward an opposing second edge 88. The surface features 78 on a bottom surface 90 may reflect the light rays 76*a*, 76*b*, 76*c* upward along the Y-axis 80 towards the LCD panel 60 through an opposing top surface 92. The textured light guide 20 extends a plate length 94 along the X-axis 82. The textured light guide 20 may be set a distance 96 (e.g., approximately 5 mm, 3 mm, or 1 mm, or less) from the light source 66. The textured light guide 20 is shown in FIG. 5 as taking a generally planar shape horizontally along the X-axis 82 and Z-axis 84. In other embodiments, however, the textured light guide 20 may have a generally wedge shape, in which the thickness (e.g., vertically along the Y-axis 80) may decrease from the first edge 86 to the opposing second edge 88 (e.g., vertically along the X-axis 82**).

The bottom surface 90 of the textured light guide 20 may be substantially planar (e.g., flat) except for an interior length 98 of an interior region 100 having the surface features 78. A perimeter 102 of the interior region 100 may be spaced a first distance 104 from the first edge 86 and a second distance 106 from the second edge 88. In some embodiments, the first distance 104 may be between approximately 1-5 mm, approximately 2-4 mm, or approximately 3 mm. In some embodiments, the bottom surface 90 is substantially smooth and planar (e.g., flat) except for the interior length 98 of the interior region 100 having the surface features 78. The surface features 78 may extend a distance $D_1$ from the bottom surface 90. The surface features 78 may be integrally molded with the light guide 20. In some embodiments, the distance $D_1$ the surface features 78 extend may be a relatively constant value between 1-50 μm, 10-40 μm, 30-40 μm, or approximately 35 μm. The surface features 78 may include light-extracting elements, such as printed dots, micro-lenses, and/or micro-prisms. Light-extracting elements enable the textured light guide 20 to guide light 74 through the first top surface 92 of the textured light guide 20. The light-extracting elements may distribute the light 74 evenly across the display region 68 of the LCD panel 60. In some embodiments, the interior region 100 and respective the surface features 78 (e.g., light-extracting elements) may be approximately greater than or equal to the area of the display region 68. In some embodiments, light-extracting elements positioned proximate to the first end 86 may attenuate the light 74 more than light-extracting elements positioned proximate to the second end 88.

A second top surface 108 of the film 72 may be positioned adjacent to the surface features 78 of the bottom surface 90. The film 72 may be substantially planar (e.g., flat) along the X-axis 82 and Z-axis 84. The film 72 may lie flat adjacent to the surface features 78 and spaced a substantially uniform distance $D_1$ from the bottom surface 90. The film 72 may have a thickness 109 with a uniform vertical profile along the Y-axis 80. When the electronic device 10 is assembled, the frame 64 and/or LCD panel 66 may provide a normal force to position the film 72 adjacent to the textured light guide 20. The film 72 may be positioned within the interior region 100 of the textured light guide 20. For example, the film 72 may have a film length 110 less than the interior length 98 such that the film 72 is spaced a distance $D_2$ from the perimeter 102 of the interior region 100. In some embodiments, the film 72 is spaced the distance $D_2$ from the perimeter 102 on each edge of the film 72. For example, $D_2$ may be between approximately 0.1-1 mm, approximately 0.3-0.7 mm, or approximately 0.5 mm. In other embodiments, the film 72 is spaced a distance $D_3$ from the perimeter 102 proximate to the light source 66, and the distance $D_3$ may be greater than $D_2$. For example, $D_3$ may be between approximately 0.3 to 2 mm, approximately 0.5 to 1.5 mm, or approximately 0.7 to 1 mm.

In some embodiments, the surface features 78 of the interior region 100 may include friction reducing features that do not extract light from the textured light guide 20. Perimeter surface features 112 along the perimeter 102 and/or proximate to the light source 66 may have different geometries than interior surface features 114 within the perimeter 102. For example, the perimeter surface features 112 may be printed dots of the same or different material as the textured light guide 20 to reduce friction with the film 72, and the interior surface features 114 may be microlenses and/or microprisms to guide light through the first top surface 92. Different perimeter surface features 112 may enable the light 74 to be primarily distributed across the display region 68 of the LCD panel 60 by the interior surface features 114.

Any suitable material may form the textured light guide 20. In one example, the textured light guide 20 may be formed from polymethyl-methacrylate, an acrylic glass commonly referred to as "PMMA." The film 72 may be a reflector film to increase the amount of light reflected from the bottom surface 90 through the textured light guide 20 towards the LCD panel 60. In some embodiments, the film 72 may include multiple layers, such as one or more reflector layers and a substrate or laminate layer, such as polyethylene terephthalate (PET). By way of example, the film 72 may be a diffuse reflector or a specular reflector. Some examples of specular reflectors include a silver reflector film or an enhanced spectral reflector (ESR) film, including a model of Vikuiti® ESR film, available from 3M Company. In some embodiments, the film 72 may be between approximately 0.05-0.25 mm, approximately 0.065-0.2 mm, or approximately 0.1-0.165 mm. While the embodiments discussed above include surface features 78 on the bottom surface 90 of the textured light guide 20 and a film 72 positioned adjacent to the bottom surface 90, presently contemplated embodiments also include surface features 78 on the first top surface 92 and optical films such as brightness enhancement films and/or diffuser films positioned above the first top surface 92.

During operation and/or storage of the electronic device 10, the textured light guide 20 and film 72 may be exposed to varying temperatures and accompanying thermal stresses. For example, thermal stresses from high temperatures (e.g., approximately 50° C. to 85° C.) may cause components of the backlight assembly 62 to expand relative to components at room temperature (e.g., approximately 23° C.), and low temperatures (e.g., approximately 0° C. to −40° C.) may cause components of the backlight assembly 62 to contract relative to room temperature components. The textured light guide 20 and film 72 may expand and contract horizontally along the X-axis 82 and the Z-axis 84. The surface features 78 may reduce the friction between the textured light guide 20 and the film 72 and enable the film 72 to slide relative to the textured light guide 20. By reducing the friction, the surface features 78 enable the textured light guide 20 and the film 72 to expand and contract independently from one another without affecting the planarity of the film 72, that is without folding or compressing the film 72 to form vertical non-uniformities along the Y-axis 80.

In some embodiments, the textured light guide 20 may expand and contract along the X-axis 82 more or at a greater rate than the film 72 may expand and contract when exposed to varying temperatures. For example, the coefficient of thermal expansion for the textured light guide 20 may be greater than the coefficient of thermal expansion for the film 72. FIG. 5 illustrates the plate length 94 and film length 110 at a room temperature (e.g., 23° C.). The plate length 94 may increase to an expanded plate length 116 and the film length 110 may increase to an expanded film length 118 at a first high temperature (e.g., 65° C.). The plate length 94 may decrease to a contracted plate length 120 and the film length 110 may decrease to a contracted film length 122 at a first low temperature (e.g., −20° C.). The interior length 98 may expand and contract similar to the plate length 94. In some embodiments, the film 72 remains positioned within the interior region 100 regardless of the temperature because the textured light guide 20 has a greater coefficient of thermal expansion than the film 72 and/or because the interior region 100 is sized to be larger along the X-axis 82 and Z-axis 84 than the film 72. The surface features 78 may reduce the friction between the textured light guide 20 and the film 72 so that the friction is insufficient to compress the film 72 and form wrinkles or cause vertical unevenness along the Y-axis 80 when the textured light guide 20 contracts relative to the film 72 (e.g., the plate length 94 contracts from the expanded plate length 116 to the contracted plate length 122). Moreover, the surface features 78 may reduce the friction so that the friction is insufficient restrict the film 72 to form wrinkles or otherwise affect the planarity of the film 72 when the film 72 relative to the textured light guide 20 (e.g., the film 72 expands from the contracted film length 122 to the expanded film length 118). The surface features 78 may enable the film 72 to slide relative to the textured light guide 20 without affecting the uniformity of the distance $D_1$ between the bottom surface 90 of the textured light guide 20 and the second top surface 108 of the film 72. The planarity of the film 72 relative to the textured light guide 20 affects the appearance of the display 18. Thus, the surface features 78 may aid the maintenance of a uniform display appearance by enabling the film 72 to move relative to the textured light guide 20 in varying temperature environments. While the above discussion addresses the expansion and contraction of the textured light guide 20 and film 72 horizontally along the X-axis 82, the surface features 78 may have a similar affect during expansion and contraction of the textured light guide 20 and film 72 horizontally along the Z-axis 84.

Figure 6:
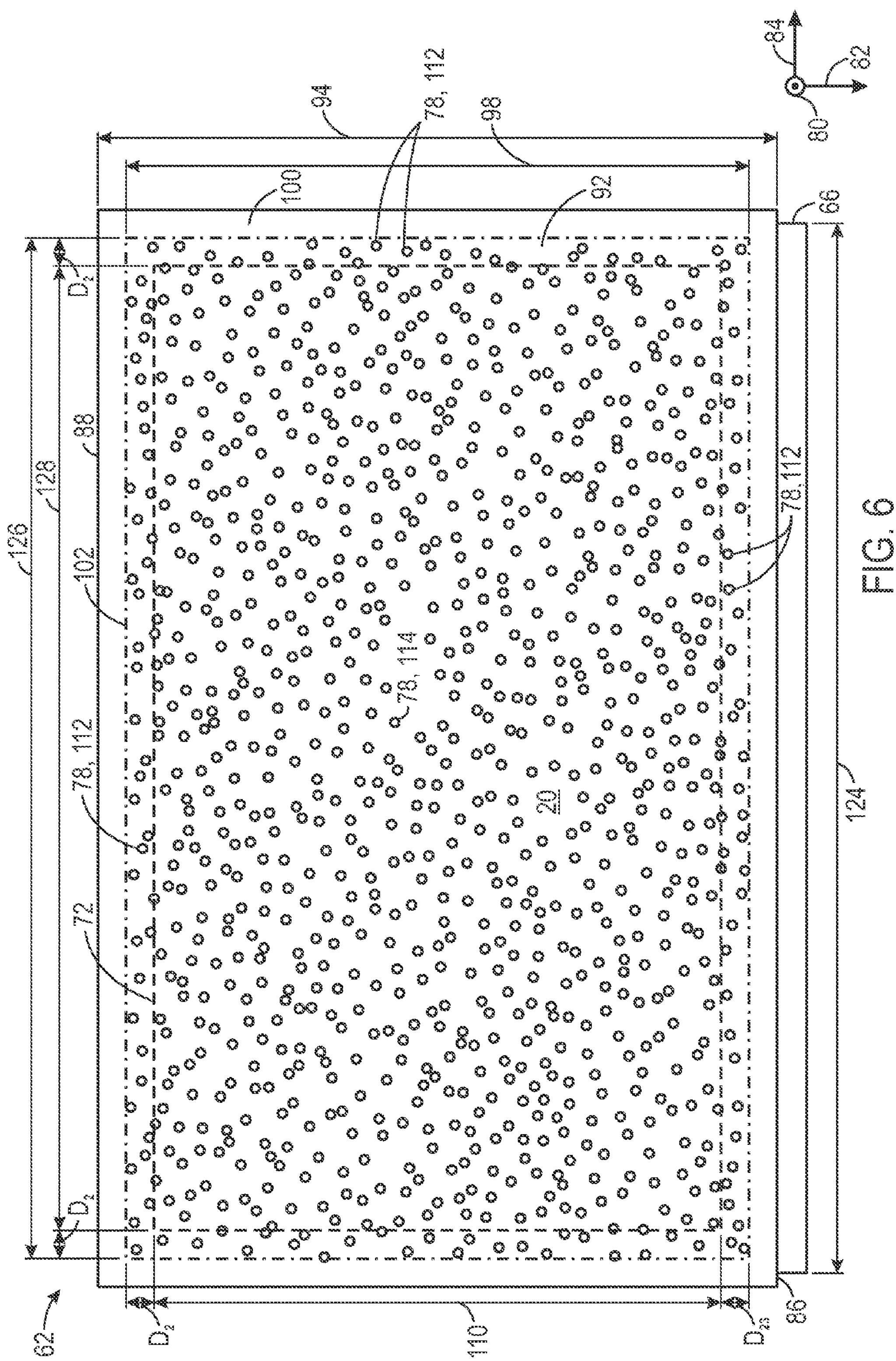
FIG. 6 is a top view of a light guide and a reflector film positioned within an interior region of the light guide, in accordance an embodiment.

FIG. 6 illustrates a top-view of an embodiment of the backlight assembly 62 with the film 72 shown within the interior region 100 beneath the textured light guide 20. In some embodiments, the surface features 78 may be distributed across the interior region 100 of the textured light guide 20 with non-uniform and/or unpatterned spacing between the surface features 78, as shown in FIG. 6. Alternatively, the surface features 78 may be distributed across the interior region 100 with regular spacing between surface features 78, or the spacing may be based on a pattern (e.g., decreasing along the X-axis 82 towards the second edge 88).

The interior length 98 of the interior region 100 extends along the plate length 94. An interior width 124 of the interior region 100 extends along a plate width 126. The film 72 may be positioned within the interior region 100 and spaced a distance $D_2$ from the perimeter 102 of the interior region 100. The film length 110 may be less than the interior length 98, and a film width 128 may be less than the interior width 124. In some embodiments, the film length 110 and film width 128 may be substantially equal to the respective dimensions of the display region 68 of the LCD panel 60 of FIG. 4, while the interior length 98 and interior width 124 may be greater than the respective dimensions of the display region 68. The surface features 78 of the interior region 100 may direct light towards the LCD panel 60 and reduce friction between the textured light guide 20 and the film 72.

As discussed above, the textured light guide 20 and film 72 may expand and contract horizontally along the X-axis 82 and Z-axis 84 based at least in part on the temperature. The surface features 78 of the interior region 100 may extend a sufficient distance $D_2$ beyond the film 72 so that the film 72 is within the interior region 100 at high temperatures (e.g., 85° C.) and low temperatures (e.g., −40° C.). Moreover, the surface features 78 reduce the friction between the film 72 and the textured light guide 20 to enable the film 72 to slide relative to the textured light guide 20 during thermal expansion and contraction without wrinkling the film 72. For example, the surface features 78 may reduce friction to enable the backlight assembly 62 to cycle between low temperatures (e.g., −40° C.) and high temperatures (e.g., 85° C.) without wrinkling the film 72). The surface features 78 may substantially prevent the bottom surface 90 from sticking to the second top surface 108 during thermal expansion and thermal contraction of the textured light guide 20. In some embodiments, the film 72 may be constrained proximate to the second end 88 so that the film 72 expands under thermal stress towards the light source 66, such that the distance $D_3$ is greater than $D_2$, and the interior region 100 extends further horizontally along the X-axis 82 and Z-axis 84 than the expanded film 72. As discussed above with FIG. 5, the film 72 may be spaced the distance $D_3$ from the perimeter 102 proximate to the light source 66. The film 72 is positioned the distance $D_3$ from the perimeter 102 so that the film 72 is in contact with multiple surface features 78 regardless of the thermal expansion and thermal contraction of the textured light guide 20 and/or film 72.

Figure 7:
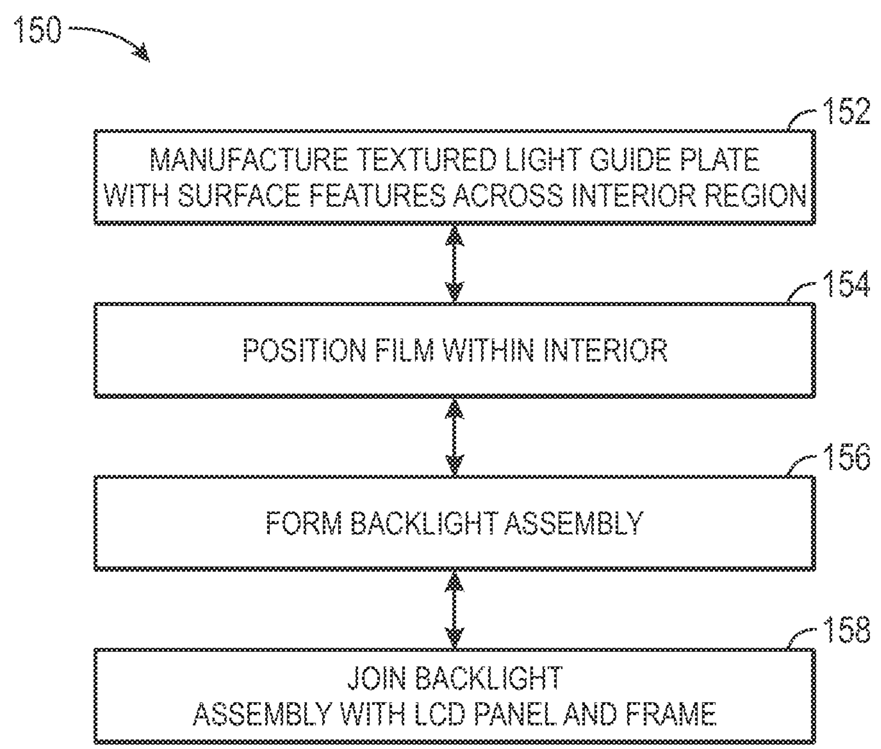
FIG. 7 is a flow chart of a method for manufacturing the electronic display of FIG. 4, in accordance with an embodiment.

The electronic display 18 shown in FIG. 4 may be manufactured according to a flowchart 150 of FIG. 7. Specifically, the textured light guide plate 20 may be manufactured (block 152) with surface features 78 across the interior region 100. The surface features 78 may be molded, etched, or otherwise formed on the first top surface 92 and/or the bottom surface 90. In some embodiments, the surface features 78 may be formed when the material to form the textured light guide 20 is injected into a steel mold. Initially creating, in the steel mold, the pattern that will produce the surface features 78 may involve a laser process. Namely, a laser may cut into the steel mold a very small pattern inverse to the resulting surface features 78 in the interior region 100. Additionally or alternatively, the surface features 78 may be formed on the textured light guide plate 20 using photolithography to etch the textured light guide plate 20.

The film 72 may be positioned (block 154) within the interior region 100 and horizontally spaced a distance within a perimeter 102. The film 72 may be a specular reflector, a diffuse reflector, or an optical enhancing film. The film 72 may be substantially flat (e.g., planar) and positioned (block 154) so that all edges are within the interior region 100. The surface features 78 within the interior region 100 may enable the film 72 to slide relative to the textured light guide 20 to reduce non-uniformities of the film 72 when temperature changes cause the film 72 and textured light guide 20 to expand and/or contract at different rates. Thereafter, the backlight assembly 62 may be formed (block 156). The light source 66 and/or additional films 72 may be positioned adjacent the textured light guide 20 to form the backlight assembly 62. The backlight assembly 62, LCD panel 60, and frame 64 may be joined (block 158) together to form the electronic display 18.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A backlight assembly, comprising:

a textured light guide comprising a first surface, wherein the first surface comprises a surface length, a surface width, and a plurality of surface features across an interior region of the first surface, wherein the plurality of surface features are disposed along and within a perimeter of the interior region, wherein the interior region comprises an interior length and an interior width, wherein the interior length is less than the surface length, and wherein the interior width is less than the surface width; and a film disposed within the perimeter of the interior region and disposed on the plurality of surface features, wherein the film comprises a film length and a film width, wherein the film length is less than the interior length, and wherein the film width is less than the interior width.

2. The backlight assembly of claim 1, wherein the plurality of surface features is arranged in a pattern across the interior region.

3. The backlight assembly of claim 1, wherein the plurality of surface features comprise one or more micro-lenses, micro-prisms, grooves, notches, or printed dots, or any combination thereof.

4. The backlight assembly of claim 1, wherein the plurality of surface features comprises perimeter surface features disposed along the perimeter, and the plurality of surface features comprises interior surface features disposed within the perimeter, wherein the perimeter surface features are different from the interior surface features.

5. The backlight assembly of claim 1, wherein the a first difference between the interior length and the film length is between approximately 0.1 to 1 mm, and a second difference between the interior width and the film width is between approximately 0.1 to 1 mm.

6. The backlight assembly of claim 1, wherein the film is disposed an approximately uniform distance from the first surface at any temperature of the textured light guide, the film, or both between approximately −40° C. to 85° C.

7. The backlight assembly of claim 6, wherein each surface feature of the plurality of surface features extends the approximately uniform distance from the first surface, wherein the approximately uniform distance is between 10-40 μm.

8. The backlight assembly of claim 1, wherein the film comprises an enhanced specular reflector film.

9. A backlight assembly, comprising:

a textured light guide comprising a top surface, a bottom surface, and a plurality of edges, wherein the bottom surface comprises an interior region comprising a plurality of surface features within a perimeter, wherein the perimeter is spaced apart from the plurality of edges;

a reflector film disposed within the perimeter and disposed adjacent to the plurality of surface features;

one or more optical films disposed adjacent to the top surface; and a light source configured to emit light into the textured light guide along a first edge of the plurality of edges toward an opposing second edge of the plurality of edges, wherein at least some of the plurality of surface features are configured to direct the emitted light toward the top surface.

10. The backlight assembly of claim 9, wherein the perimeter is spaced a first distance from the first edge, the perimeter is spaced a second distance from the second edge, the first distance is greater than the second distance, and the second distance is less than or equal to approximately 1 mm.

11. The backlight assembly of claim 9, wherein the plurality of surface features comprises a first group of surface features and a second group of surface features, wherein the first group of surface features comprises surface features of the plurality of surface features proximate to the first edge, and the first group of surface features differ from the second group of surface features in geometry, material, or coefficient of friction, or reflectivity, or any combination thereof.

12. The backlight assembly of claim 11, wherein the first group of surface features comprises perimeter surface features of the plurality of surface features disposed along the perimeter, and the second group of surface features comprises interior surface features of the plurality of surface features disposed within the perimeter.

13. The backlight assembly of claim 9, wherein the bottom surface is substantially smooth between the plurality of edges and the perimeter.

14. The backlight assembly of claim 13, wherein the reflector film is substantially parallel to the bottom surface at temperatures between approximately −40° C. to 85° C., and the bottom surface is substantially planar.

15. The backlight assembly of claim 9, wherein the reflector film comprises a specular reflector or a diffuse reflector.

16. The backlight assembly of claim 9, wherein the light source comprises one or more light emitting diodes (LEDs).

17. An electronic display, comprising:

a liquid crystal display panel comprising a display region; and a backlight assembly configured to supply light to illuminate the liquid crystal display panel, wherein the backlight assembly comprises:

a textured light guide comprising a top surface and bottom surface, wherein the bottom surface comprises a plurality of surface features across an interior region of the bottom surface, an interior area of the interior region is greater than or equal to a display area of the display region, the interior region is disposed beneath the display region, and the interior region comprises an interior length and an interior width;

a reflector film disposed adjacent to the plurality of surface features and disposed within the interior region of the textured light guide, wherein the film comprises a film length and a film width, the film length is less than the interior length, and the film width is less than the interior width;

one or more optical films disposed adjacent to the top surface of the textured light guide; and a light source configured to emit light into the textured light guide along a first edge of the textured light guide between the top surface and the bottom surface of the textured light guide, wherein at least some of the plurality of surface features are configured to direct the emitted light through the optical films and the display area.

18. The electronic display of claim 17, wherein the reflector film is configured to slide without wrinkling within the interior region along the plurality of surface features relative to the textured light guide when the textured light guide expands or contracts relative to the reflector film.

19. The electronic display of claim 17, wherein the reflector film comprises a plurality of reflector layers and a laminate layer.

20. The electronic display of claim 19, wherein a thickness of the reflector film is less than approximately 0.165 mm.

21. The electronic display of claim 17, wherein the optical films comprise a brightness enhancement film, a diffuser film, or both.

22. An electronic device, comprising:

one or more input structures;

a storage structure encoding one or more executable routines;

a processor capable of receiving inputs from the one or more input structures and of executing the one or more executable routines when loaded in the storage structure; and a display device configured to display an output of the processor, wherein the display device comprises:

a liquid crystal display panel; and a backlight assembly configured to supply light to illuminate the liquid crystal display panel, wherein the backlight assembly comprises:

a textured light guide comprising a top surface, a bottom surface, and a plurality of edges, wherein the bottom surface comprises an interior region comprising a plurality of surface features within a perimeter, wherein the perimeter is spaced at least a second distance from the plurality of edges of the textured light guide; and a reflector film disposed adjacent to the bottom surface of the textured light guide, wherein the reflector film is spaced between approximately 0.1 to 1 mm from the perimeter.

23. The electronic device of claim 22, wherein the electronic device comprises a desktop computer, a laptop computer, a tablet computer, a media player, a portable phone, a personal data organizer, or a handheld game platform.

24. A method for manufacturing an electronic display, comprising:

forming surface features across an interior region of a bottom surface of a textured light guide, wherein the surface features are molded, etched, or printed, or any combination thereof;

positioning a reflector film adjacent to the interior region, wherein the reflector film is vertically spaced a first distance from the bottom surface, and wherein the reflector film is positioned within the interior region and spaced between approximately 0.1 to 1 mm from a perimeter;

forming a backlight assembly about the textured light guide and reflector film; and joining the backlight assembly with a liquid crystal display panel and a frame.

25. The method of claim 24, wherein the reflector film is substantially planar and is positioned to be substantially parallel to the textured light guide.

* * * * *